United States Patent Office 2,988,541
Patented June 13, 1961

2,988,541
METHOD OF MAKING ANHYDRIDE POLYMERS
Waldo L. Semon, Northfield, and John F. Jones, Cuyahoga Falls, Ohio, assignors to The B. F. Goodrich Company, New York, N.Y., a corporation of New York
No Drawing. Filed Dec. 27, 1955, Ser. No. 555,238
27 Claims. (Cl. 260—80)

This invention relates to methods of preparing substantially linear and cross-linked polymers having a series of recurring anhydride linkages attached to the main polymer chain and more particularly refers to methods of preparing polymers having a plurality of

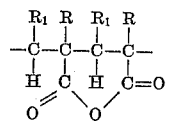

linkages, which may be referred to as alpha-methylene glutaric anhydride groups, by subjecting mixed anhydrides of an alpha-beta-unsaturated monobasic acid and a carboxylic acid having no non-aromatic unsaturation and having at least 2 carbon atoms to polymerizing conditions in the substantial absence of water and if desired in the presence of a dehydrating agent. In the above formula R is selected from the class consisting of hydrogen, a halogen selected from the class consisting of chlorine, bromine and fluorine, a —CN group, an alkyl group having from 1 to 10 carbon atoms, an aryl group, and an aralkyl group and $R_1$ represents hydrogen and a halogen selected from the class consisting of chlorine, bromine and fluorine.

In a copending application Serial No. 555,308, filed December 27, 1955, by John F. Jones properties of linear and cross-linked polymers having a plurality of glutaric anhydride linkages as part of the main polymer chain are described. The method of making the polymers described and claimed in the copending application involve treating a polymer or copolymer of acrylic acid or a substituted acrylic acid with a dehydrating agent, or polymerizing monomeric acrylic acid, substituted derivatives thereof or a mixture of copolymerizable monomers in the presence of a dehydrating agent.

The linear, non-cross-linked, polymers of this invention are permanently fusible and dissolve readily without reaction in several solvents such as gamma-butyrolactone or dimethyl formamide. The anhydride linkages can be broken with aqueous alkali to form salts of carboxylic acids.

The cross-linked polymers of this class on the other hand are not truly soluble in any known solvent, but they will form highly viscous mucilages in alkaline aqueous media by rupture of the anhydride linkages and salt formation with the carboxyl groups. The mucilages retain their viscosity stability in alkaline media over very long periods of time and are not hydrolyzed to linear polymers by action of the alkali. To prepare cross-linked polymers with anhydride linkages it is essential that a polyunsaturated cross-linking agent which is not hydrolyzed by mild alkali be employed. The degree of cross-linking can be regulated so as to control the hydrophilic properties of the polymer.

An object of the invention is the provision of a method for preparing linear and cross-linked polymers having a plurality of anhydride linkages derived from an alpha-beta-unsaturated monocarboxylic acid or substituted derivatives of said acid by subjecting to polymerization conditions in the substantial absence of water a mixed anhydride of (1) an alpha-beta-unsaturated monocarboxylic acid or substituted derivatives thereof and (2) mono or polycarboxylic acid having at least two carbon atoms and being free of non-benzenoid unsaturation.

Another object is the provision of a method for preparing polyacrylic anhydride by subjecting to polymerization temperature in the presence of a free radical polymerization catalyst and the substantial absence of water a mixed anhydride of acrylic acid and a mono or polycarboxylic acid having at least two carbon atoms and no non-aromatic unsaturation.

Another object is the provision of a method for preparing polymethacrylic anhydride by subjecting to polymerization temperature in the presence of a free radical polymerization catalyst and the substantial absence of water a mixed anhydride of methacrylic acid and a mono or polycarboxylic acid having no non-aromatic unsaturation and at least two carbon atoms.

Another object is the provision of a method for preparing cross-linked polymers containing a plurality of alpha-methylene glutaric anhydride groups, as defined above, by subjecting to polymerization temperature in the presence of a free radical polymerization catalyst and the substantial absence of water a mixture of a small amount of polyunsaturated cross-linking agent which is stable to aqueous alkali and a mixed anhydride of an alpha-beta-unsaturated monocarboxylic acid and a mono or polycarboxylic acid having at least two carbon atoms and no non-aromatic unsaturation.

The above objects are accomplished by taking a mixed anhydride of an alpha-beta-unsaturated carboxylic acid having the generic formula

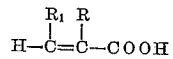

and a saturated carboxylic acid having at least 2 carbon atoms and conforming to the generic formula $R_2$—$(COOH)_n$ in which $n$ is an integer with or without the presence of a polyunsaturated cross-linking agent, adding an inert diluent, adding a free radical polymerization catalyst and heating the mixture to polymerization temperature, in the absence of water and preferably in the absence of oxygen. In these formulas R and $R_1$ have the same designation as that defined above and $R_2$ is the hydrocarbon or halogenated hydrocarbon radical of a mono or polycarboxylic acid having no non-aromatic or non-benzenoid unsaturation.

The mixed anhydrides have the generic formula

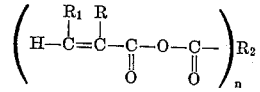

wherein R, $R_1$, $R_2$ and $n$ have the same designation as above. More specifically $R_2$ is a hydrocarbon or a halogenated hydrocarbon radical containing no aliphatic unsaturation and is selected from the class consisting of saturated aliphatic and alicyclic hydrocarbon radicals, aryl, alkaryl and aralkyl hydrocarbon radicals and halogenated derivatives thereof.

The alpha-beta-unsaturated monocarboxylic acid moiety of the mixed anhydride can be derived from acrylic acid, methacrylic acid, alpha-chloro, -bromo, or -fluoro acrylic acids, alpha-ethyl, -propyl, -butyl, -amyl, -hexyl, -heptyl, -octyl, -nonyl and -decyl acrylic acid, alpha-phenyl acrylic acid, alpha-cyano acrylic acid, alpha-benzyl acrylic acid, alpha-tolyl acrylic acid, and other alpha-substituted acrylic acids with hydrocarbon or halogenated hydrocarbon substituents having up to about 10 carbon atoms and being free of nonbenzenoid unsaturation. Included in the above designation also are the beta-chloro, -bromo and -fluoro derivatives of the named acids.

The carboxylic acid moiety of the mixed anhydride can be any saturated aliphatic, alicyclic or aromatic mono or polycarboxylic acid having at least two carbon atoms or a halogen substituted derivative thereof. Representative acids include such acids as acetic, propionic, butyric, pentanoic, hexanoic, and octanoic acids as well as other carboxylic acids corresponding to the general formula $C_nH_{2n+1}COOH$ in which $n$ is an integer from 2 to about 8 and halogen substituted derivatives. Other acids include benzoic, toluic, xylinic, ethyl benzoic, trimethyl benzoic, and other alkyl and halogen substituted benzoic acids. Alicyclic acids include cyclohexanemonocarboxylic acid, cyclopentane monocarboxylic acid and alkyl and halogen substituted derivatives thereof. The aryl substituted monocarboxylic aliphatic acids include such acids as phenyl acetic acid, phenyl propionic acids, naphthyl acetic acid and other saturated aliphatic acids having an aromatic substituent on the aliphatic chain.

Representative polycarboxylic acids are malonic, succinic, glutaric, adipic, pimelic, suberic, azelaic, sebacic, phthalic, isophthalic, terephthalic, naphthalic, biphenyl-o,o'-dicarboxylic, trimellitic, trimesic, cyclobutane-1,3-dicarboxylic, cyclopentane dicarboxylic, and the cyclohexane dicarboxylic acids. The polybasic acids should have 3 or more carbon atoms.

The preferred mixed anhydrides are those of acetic acid and acrylic or methacrylic acid. These two mixed anhydrides have the following structural formulas

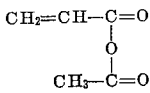

and

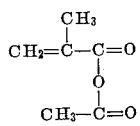

respectively.

One method of preparing the mixed anhydrides consists of reacting ketene or a homologue thereof with the appropriate alpha-beta-unsaturated monocarboxylic acid. This reaction is believed to proceed as follows:

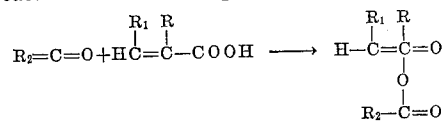

R and $R_1$ have the same designation as above and $R_2$ is the dihydrogen, monohydrogen and monohydrocarbon or dihydrocarbon radical of the ketene. Thus, if ketene ($CH_2=C=O$) itself is reacted with acrylic acid the product that results is a mixed anhydride of acrylic and acetic acids

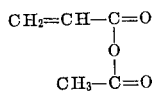

Substitution of methacrylic acid or another derivative for the acrylic acid will produce the corresponding mixed anhydride, which when treated under polymerization conditions, will produce a polymer having a plurality of alpha-methylene or substituted alpha-methylene glutaric anhydride groupings as part of the main polymer chain.

Another method of preparing the mixed anhydrides of acrylic acid is to react acetylene and carbon monoxide in the presence of a metal carbonyl and a carboxylic acid which is free of non-benzenoid unsaturation. This reaction can be written as follows:

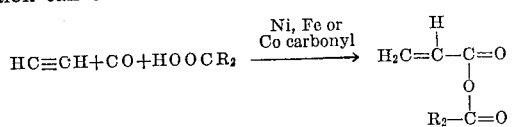

wherein $R_2$ has the same designation as above.

Another method for preparing mixed anhydrides of alpha-beta-unsaturated carboxylic acids and acids which are not copolymerizable therewith having the formula

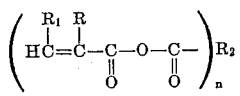

consists of reacting an acid halide of one of such acids with a metal salt of the other of said acids, thus, for example, sodium acetate or sodium propionate can be reacted with acrylyl chloride to form a mixed anhydride of acrylic and acetic or acrylic and propionic acids or sodium acrylate can be reacted with acetyl or propionyl chloride to form the corresponding mixed anhydride of acrylic and acetic or acrylic and propionic acids. In place of the metal salt the free carboxylic acid can be employed.

In carrying out the process of preparing mixed anhydrides a diluent is not absolutely essential. However, it is preferred to have an inert diluent in which the undesired end product of the reaction, such as sodium chloride, if a sodium salt of one acid and an acid chloride of another are reacted, is insoluble and then separate the undesired material from the solution of mixed anhydride by filtration. Examples of diluents which can be used are those in which the mixed anhydride is soluble, such as benzene, toluene, xylene and halogenated liquid aromatic hydrocarbons and liquid halogenated saturated aliphatic hydrocarbons. The latter include carbon tetrachloride, chloroform, chloropentane and other liquid materials of the general group.

In the preparation of the anhydride polymers of this invention it is essential that the non-polymerizable carboxylic acid moiety of the mixed anhydride have at least two carbon atoms. A mixed anhydride of acrylic acid or its homologues or analogues and formic acid will polymerize to form either a polymer in which the anhydride linkage remains as a mixed anhydride or the anhydride linkage is destroyed so that polyacrylic acid, carbon monoxide and water are formed during the polymerization step.

The following examples are intended to illustrate more fully the preparation of polymers having anhydride groups attached to the polymer chain in accordance with the methods of this invention, but they are not to be construed as a limitation on the scope thereof.

In the examples the parts are by weight unless otherwise specified.

*Example I*

A 10% weight solution of glacial acrylic acid, containing at least 95% acrylic acid, was reacted with ketene, by bubbling gaseous ketene through the mixture until the first sign of a ketene dimer was apparent as evidenced by a slightly yellow color. Thereafter nitrogen was bubbled through the mixture to remove unreacted ketene. This reaction which is somewhat exothermic was carried out in the cold by circulating a cooling medium around the reaction vessel. From analysis of the mixture it was determined that about 75% of the acrylic acid reacted with ketene.

The mixture containing the acrylic acid-ketene reaction product was then polymerized in the presence of 2% caprylyl peroxide at a temperature of about 50° C. in a nitrogen atmosphere. The yield of polyacrylic anhydride was quantitative. The polymer was a fine white powder which was soluble in gamma-butyrolactone. The filtrate contained 97% of the alkali absorption capacity that would be expected from the elimination of acetic anhydride from the mixed acrylic-acetic anhydride. The cation capacity of the polymer was 15.87 meq./g.

*Example II*

One liter of a 30% by weight solution of methacrylic acid in benzene was cooled in a jacketed kettle. A stream of ketene was admitted into the benzene-methacrylic acid solution. The reaction is more sluggish than that of acrylic acid. However, after about 2 hours about 50% of the methacrylic acid was reacted. The unreacted ketene was swept out of the mixture with nitrogen. Benzoyl peroxide catalyst was added to the benzene solution and the mixture was heated to 60° C. Additional amounts of catalyst were added as the polymerization proceeded until a total concentration of 2%, based on the original methacrylic acid, was present in the mixture.

The methacrylic anhydride formed as a fine white floc. It was very slowly soluble in water and readily soluble in dimethyl formamide.

The ketene-methacrylic acid reaction temperature was held about 25–27° C.

Substituted ketenes such as methyl, ethyl, propyl, phenyl, diphenyl, benzyl and others will also react with acrylic, methacrylic or other acrylic acid derivatives having the generic formula

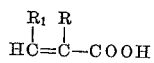

as defined above. The mixture which results from the reaction can then be subjected to polymerization conditions by the methods described in the above examples to produce a linear polymer having anhydride linkages attached to the main polymer chain. If desired a mixture of ketenes can be employed for the reaction with the acid. A mixture of alpha-beta-unsaturated acids can be used for preparing alpha-beta-unsaturated acid-ketene reaction products and the mixture can then be copolymerized or each alpha-beta-unsaturated acid can be reacted separately with ketene or a homologue thereof and the alpha-beta-unsaturated acid-ketene reaction product can be mixed thereafter to form a linear copolymer in which R and $R_1$ substituents are different and having anhydride linkages attached to the main polymer chain.

Thus, for example, a linear copolymer having both alpha-methylene glutaric anhydride and substituted alpha-methylene glutaric anhydride linkages in the main polymer chain can be prepared. In this manner it is possible to have alkyl groups, cyano groups, chlorine, bromine or fluorine atoms, phenyl groups and hydrogen atoms in substantially any desired ratio in the R and $R_1$ positions of the generic structural unit

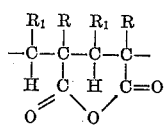

of the polymer.

*Example III*

A mixture of 200 parts of acetic acid and 300 parts of acetic anhydride was prepared in a three necked flask equipped with a thermometer and mechanical stirrer. Air was swept out of the flask with nitrogen. The mixture was then heated to 40–50° C. and acetylene was added to the liquid mixture. Nickel carbonyl was added slowly. An exothermic reaction started and the temperature of 40–50° C. was thereafter maintained by the controlled addition of nickel carbonyl. A total of about 15 ml. of the catalyst was added. Upon completion of the catalytic reaction 100 ml. of the reaction mixture was transferred to a polymerization flask, 2 parts by weight, based on the mixed saturated-unsaturated anhydride, of azodiisobutyronitrile was added, air was swept from the flask with nitrogen and the temperature was adjusted to 50° C. The polymer which was contaminated with nickel was slowly soluble in water and dissolved readily in dimethyl formamide but was insoluble in acetone. In place of nickel carbonyl, cobalt carbonyl or iron carbonyl can be used in preparing the mixed anhydride of this example.

Carboxylic acids having no aliphatic unsaturation can be substituted for acetic acid in the above reaction with acetylene and carbon monoxide. These include propionic acid, butyric acid, pentanoic acid and other saturated aliphatic acids, the cycloaliphatic acids and aromatic acids heretofore mentioned. Acetylene and carbon monoxide will react with the acid to form the corresponding mixed anhydride of acrylic acid.

The presence of acetic anhydride or any other anhydride is not essential for the reaction between carbon monoxide, acetylene and carboxylic acid to form the mixed anhydride of acrylic acid. However, it is desirable to have the anhydride present to tie up any water that may be inadvertently admitted into the reaction mixture either during the reaction of the carboxylic acid with acetylene and carbon monoxide or during the subsequent polymerization step.

*Example IV*

A mixture of 25 parts by weight of acrylyl chloride and 30 parts by weight of sodium propionate was prepared in 200 parts of dry benzene. This mixture was allowed to stand at room temperature for about 3 days with occasional shaking. The sodium chloride which formed was removed by filtration. To the filtrate was added .5 part of azobisdiisobutyronitrile and the temperature was adjusted to 50° C. and held there for about 24 hours. A polymer separated as a fine white floc. The polymer was recovered by filtration and dried at 50° C. in a vacuum oven at 1 millimeter pressure over solid sodium hydroxide. This polymer had a cation capacity of 14.69 milliequivalents per gram, which is about 94% of the theoretical capacity for a polymer having all its carboxyl groups converted to anhydride groups. The polymer was soluble in aqueous NaOH, dimethyl formamide and gamma-butyrolactone which indicates its linear configuration.

*Example V*

25 parts of sodium acrylate and 26 parts of phthalyl dichloride were added to 200 milliliters of dry benzene and permitted to stand until no further precipitation of sodium chloride could be observed. The solution of the mixed anhydride of phthalic acid and acrylic acid having the following structural formula

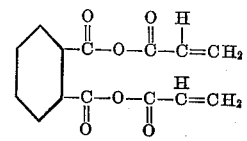

was separated from the precipitated sodium chloride by filtration. The filtrate temperature was adjusted to 50° C. One-half gram of benzoyl peroxide catalyst was added and oxygen was flushed out of the system with nitrogen. The polymer which formed settled as a fine white floc. It had a cation capacity of 14.08 milliequivalents per gram. The polymer from this reaction was apparently of very high molecular weight since it is soluble in gamma-butyrolactone and dimethyl formamide only after standing in the mixture for a very long period of time. Usually from 2 to 3 days are required for complete solution of the polymer. In aqueous sodium hydroxide, however, the polymer goes into solution without great difficulty.

*Example VI*

A mixture of 25 parts of sodium acrylate and 23.5 parts of adipoyl chloride in 200 milliliters of dry benzene was prepared and the mixture was permitted to stand for 24 hours. The solution of mixed anhydride was separated from the sodium chloride precipitate by filtration. 0.5 part of benzoyl peroxide catalyst was added to the benzene solution. Air was swept out of the polymerization flask with nitrogen and the mixture was heated to 50° C. and held there for 24 hours. A polymer formed as a fine white floc in the benzene. The polymer was recovered by filtration, dried and tested for its cation absorbing capacity. It was found to have a capacity of 14.51 milliequivalents per gram. This polymer was also difficultly soluble in gamma-butyrolactone and dimethyl formamide but was readily soluble in aqueous sodium hydroxide.

Cross-linked polymers having a plurality of recurring alpha-methylene glutaric anhydride groups and having chains which are resistant to scission by mild aqueous alkalies, can be prepared by copolymerizing the mixed anhydride with from about 0.01 to about 30% by weight, based on the mixed anhydride of a polyunsaturated monomer having a plurality of terminal $CH_2=C<$ groups. The cross-linking agents include polyunsaturated hydrocarbons such as divinyl cyclohexane, low molecular weight conjugated dienes such as polybutadiene and other conjugated diene polymers having substantial unsaturation in the polymer molecule which can be effected by sodium polymerization of the diene, polyunsaturated sulfones such as hexaallyl trimethylene trisulfone; unsaturated amides such as trimethacrylyltriazine and methylene bisacrylamide, polyunsaturated acids such as beta-styryl acrylic acid, polyunsaturated ethers such as divinyl ether, diallyl ether, diallyl ethylene glycol, 1,4,5,8-naphthalene tetrol ethers, the vinyl allyl, methallyl and crotyl polyethers containing 2 to 7 or more akenyl ether groups per molecule, polyunsaturated ketones such as divinyl ketone or diallyl ketone, polyunsaturated compounds containing one or more functional groups, such as the half ethers, allyl-beta-allyloxypropionate and allyl methacrylyl sucrose, partial ethers of polyhydric alcohols such as diallyl glycerol, polyallyl sucrose having from 3 to 6 allyl groups per sucrose molecule, tri and tetraallyl pentaerythritol, tri and tetraallyl erythritol, tri-, tetra-, penta- and hexaallyl sorbitol or mannitol, polyallyl glucose, polyallyl levulose, polyallyl mannose, polyallyl gulose, polyallyl threose, polyallyl erythrose, polyallyl arabinose, polyallyl ribose, polyallyl xylose, polyallyl galactose, polyallyl lactose and other polyethers of mono-, di-, tri- and higher saccharides all of which contain at least three allyl groups per sugar molecule. Polyunsaturated esters will also form cross-linked anhydride containing polymers but they are sensitive to the hydrolytic action of mild alkalies which causes chain scission of the cross-linked copolymer. These esters include diallyl maleate, diallyl phthalate, diallyl malonate, diallyl succinate, and other allyl or vinyl esters of polycarboxylic acids. Included also are the di- or polyesters of unsaturated acids and polyols such as diacrylyl ethylene glycol, triacrylyl glycerol, diacrylyl 1,4-butanediol, and other esters of acrylic or methacrylic acid and polyols.

Other linear or cross-linked interpolymers can also be prepared, if desired, substantially linear polymers can be made by copolymerizing the mixed anhydride of an unsaturated alpha-beta monocarboxylic acid and a carboxylic acid having no aliphatic unsaturation. The reaction product of ketene and the alpha-beta-unsaturated carboxylic acid or the reaction product of acetylene, carbon monoxide and a carboxylic acid can be blended with one or more monomers to form interpolymers having alpha-methylene glutaric anhydride linkages. In preparing the interpolymers at least one molar equivalent or more of the mixed anhydride based on the comonomers should be used. The comonomers that can be employed include maleic anhydride, monobromomaleic anhydride, monochloromaleic anhydride, monofluoromaleic anhydride, dichloromaleic anhydride, dibromomaleic anhydride, difluoromaleic anhydride, beta-alkyl substituted acrylic acids in which the alkyl substituent has from 1 to 12 carbon atoms, crotonic acid, angelic acid, tiglic acid, beta-cyano acrylic and methacrylic acids, cinnamic acid, beta-benzyl acrylic acid, beta-tolyl acrylic acid, 2,3-diethyl acrylic acid, 2,3-dipropyl acrylic acid, vinyl alkyl ethers such as methyl, ethyl, propyl or butyl vinyl ethers, vinyl alkyl ketones such as methyl, ethyl, propyl and butyl vinyl ketones and vinyl esters of aliphatic acid such as vinyl acetate, propionate, butyrate or stearate.

The anhydride polymers of this invention are thermoplastic in that they can be repeatedly fused and solidified without apparent decomposition. The anhydride polymers adhere exceptionally well to glass and to metals such as aluminum, brass and iron and can be used for laminating two or more metals to each other or they can be used for the storage of anhydrous hydrocarbons. The metal laminates can be prepared by spreading the fine anhydride polymers on the surface of a metal plate or foil on top of the anhydride polymer and then subjecting the structure to heat of about 200-300° C. and pressure up to about 2000 pounds per square inch to melt the polymer and cause it to flow. On cooling the laminate under pressure the pieces of metal will be very strongly bonded to each other.

Although the invention has been described by specific examples, these intend to be illustrative only for it is evident that there are possible variations in ingredients, proportions thereof and reaction conditions without departing from the scope and spirit of the appended claims.

What is claimed is:
1. A method of preparing polymers having a plurality of

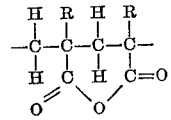

groups as part of the main polymer chain, wherein R is selected from the class consisting of hydrogen, an alkyl group having from 1 to 10 carbon atoms, chlorine, bromine and fluorine, comprising treating under polymerization conditions in the substantial absence of water in the presence of a free-radical polymerization catalyst a member selected from the class consisting of (1) the product formed by the reaction of acetylene, carbon monoxide and a monocarboxylic acid having at least two carbon atoms in the presence of a metal carbonyl, said carboxylic acid having no non-benzenoid unsaturation, (2) the product formed by the reaction of a ketene with a monomeric alpha-beta-unsaturated monocarboxylic acid having the formula

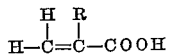

wherein R has the same designation as above, said ketene and said unsaturated acid being reacted in proportions sufficient to convert at least about 50% of the acid to a mixed anhydride, (3) the product formed by the reaction of substantially equivalent proportions of a monomeric salt of said unsaturated acid and an acid halide having the generic formula

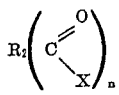

wherein X is a halogen, $R_2$ is selected from the class consisting of hydrocarbon radicals and halogen substituted derivatives thereof said hydrocarbon radicals having from 1 to about 8 carbon atoms and having no non-aromatic unsaturation and $n$ is an integer and (4) substantially equivalent proportions of acid halides of said alpha-beta-unsaturated monocarboxylic acids and salts of the acids having the generic formula $R_2(COOH)_n$ wherein $R_2$ and $n$ have the same designation as above.

2. A method of preparing a polymer having a plurality of $$-CH_2-CH-CH_2-CH-$$
$$\phantom{-CH_2-}|\phantom{CH-CH_2-}|$$
$$O=C\phantom{-}\!\!-\!\!-O\!\!-\!\!-\!\!C=O$$

groups as part of the main polymer chain, comprising treating under polymerization conditions in the substantial absence of water, in the presence of a free radical polymerization catalyst the product formed by reacting acetylene, carbon monoxide and a carboxylic acid having at least two carbon atoms and no non-benzenoid unsaturation, in the presence of a catalyst selected from the class consisting of nickel carbonyl, ferric carbonyl, and cobalt carbonyl.

3. The method of claim 2 in which the polymerization is effected in the presence of an anhydride of a carboxylic acid having no non-benzenoid unsaturation.

4. The method of claim 2 in which the carboxylic acid reacted with acetylene is acetic acid in the presence of acetic anhydride.

5. The method of preparing a polymer having a plurality of $$\phantom{-CH_2-}CH_3\phantom{-CH_2-}CH_3$$
$$\phantom{-CH_2-}|\phantom{-CH_2-C-CH_2-}|$$
$$-CH_2-C-CH_2-C-$$
$$O=C-O\!\!-\!\!-\!\!C=O$$

groups as part of the main polymer chain comprising treating, under polymerization conditions in the substantial absence of water in the presence of a free-radical polymerization catalyst, the product formed by the reaction of methacrylic acid and sufficient amount of a ketene to convert at least 50% of the methacrylic acid to a mixed anhydride.

6. The method of preparing a polymer having a plurality of $$\phantom{-CH_2-}H\phantom{-CH_2-C-}H$$
$$\phantom{-CH_2-}|\phantom{-CH_2-C-CH_2-}|$$
$$-CH_2-C-CH_2-C-$$
$$O=C-O\!\!-\!\!-\!\!C=O$$

groups as part of the main polymer chain comprising treating under polymerization conditions, in the substantial absence of water, in the presence of a free radical polymerization catalyst the product formed by the reaction of a ketene and acrylic acid said ketene and said acid being reacted in proportions sufficient to convert at least 50% of the acid to a mixed anhydride.

7. The method of claim 5 in which the ketene is ketene itself.

8. The method of claim 6 in which the ketene is ketene itself.

9. The method of preparing polymers having a plurality of $$\phantom{-}H\phantom{-}H\phantom{-}H\phantom{-}H$$
$$\phantom{-}|\phantom{-}|\phantom{-}|\phantom{-}|$$
$$-C-C-C-C-$$
$$\phantom{-}H\phantom{-|\phantom{-}}|\phantom{-}H$$
$$\phantom{-}O=C\phantom{-\!-\!-\!-}C=O$$
$$\phantom{-}\diagdown\phantom{-}\diagup$$
$$\phantom{-}O$$

groups as part of the main polymer chain comprising polymerizing at a temperature between about 40° C. and about 70° C., in the substantial absence of water, in the presence of a free radical polymerization catalyst, and in the presence of an inert diluent, the reaction product of ketene, and acrylic acid formed in a hydrocarbon solvent for the acrylic acid at a temperature below about 35° C., said ketene and acrylic acid being reacted in proportions sufficient to convert at least about 50% of the acid to a mixed anhydride.

10. The method of preparing a polymer having a plurality of $$\phantom{-CH_2-}CH_3\phantom{-CH_2-}CH_3$$
$$\phantom{-CH_2-}|\phantom{-CH_2-C-CH_2-}|$$
$$-CH_2-C-CH_2-C-$$
$$O=C-O\!\!-\!\!-\!\!C=O$$

groups as part of the main polymer chain comprising polymerizing, in the substantial absence of water, in the presence of an inert diluent and a free radical catalyst at a temperature between about 40° C. and 70° C. the product formed by reacting ketene with methacrylic acid in the presence of a hydrocarbon solvent for the methacrylic acid at a temperature below about 35° C. said ketene and methacrylic acid being reacted in proportions sufficient to convert at least about 50% of the acid to a mixed anhydride.

11. The method of preparing a polymer having a plurality of $$-CH_2-CH-CH_2-CH_2-$$
$$\phantom{-CH_2-}|$$
$$O=C\!\!-\!\!-O\!\!-\!\!-\!\!C=O$$

groups as part of the main polymer chain comprising polymerizing in the substantial absence of water, in the presence of a free radical catalyst at a temperature between about 40° C. and about 70° C., the product formed by reacting acetylene, carbon monoxide and a saturated monocarboxylic aliphatic acid in the presence of an anhydride of said acid and in the presence of nickel carbonyl.

12. A method of preparing polymers having a plurality of $$-CH_2-CH_2-CH_2-CH_2-$$
$$\phantom{-CH_2-}|\phantom{-CH_2-CH_2-}|$$
$$O=C\!\!-\!\!-O\!\!-\!\!-\!\!C=O$$

groups as part of the main polymer chain comprising treating under polymerization conditions in the substantial absence of water in the presence of a free radical polymerization catalyst the product formed by reacting substantially equivalent proportions of an alkali metal acrylate with an acid halide having the formula $$R_2\!\!\left(\!\!C\!\!\diagup^{\!\!O}_{\!\!X}\!\!\right)_{\!\!n}$$

in which $R_2$ is selected from the class consisting of hydrocarbon radicals having no non-aromatic unsaturation and halogen substituted derivatives thereof, X is a halogen and $n$ is an integer.

13. A method of preparing polymers having a plurality of $$\phantom{-CH_2-}CH_3\phantom{-CH_2-}CH_3$$
$$\phantom{-CH_2-}|\phantom{-CH_2-C-CH_2-}|$$
$$-CH_2-C-CH_2-CH-$$
$$O=C-O\!\!-\!\!-\!\!C=O$$

groups as part of the main polymer chain comprising treating under polymerization conditions in the substantial absence of water in the presence of a free radical polymerization catalyst the product formed by reacting substantially equivalent proportions of an alkali metal methacrylate with an acid halide having the formula $$R_2\!\!\left(\!\!C\!\!\diagup^{\!\!O}_{\!\!X}\!\!\right)_{\!\!n}$$

in which $R_2$ is selected from the class consisting of hydrocarbon radicals having from 1 to 8 carbon atoms and having no aromatic unsaturation and halogen substituted derivatives thereof, X is a halogen and $n$ is an integer.

14. The method of claim 12 in which the alkali metal acrylate is sodium acrylate and the acid halide is acetyl chloride.

15. The method of claim 12 in which the alkali metal acrylate is sodium acrylate and the acid halide is phthaloyldichloride.

16. The method of claim 12 in which the alkali metal acrylate is sodium acrylate and the acid halide is adipoyldichloride.

17. The method of claim 13 in which the alkali metal methacrylate is sodium methacrylate and the acid halide is acetyl halide.

18. The method of claim 13 in which the alkali metal methacrylate is sodium methacrylate and the acid halide is phthaloyldichloride.

19. The method of claim 13 in which the alkali metal methacrylate is sodium methacrylate and the acid halide is adipoyldichloride.

20. The method of preparing polymers having a plurality of

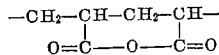

groups as part of the main polymer chain comprising treating under polymerization conditions in the substantial absence of water and in the presence of a free radical polymerization catalyst the product formed by reacting substantially equivalent proportions of an acid halide of acrylic acid and an alkali metal salt of an acid having the formula $R_2(COOH)_n$ in which $R_2$ is selected from the class consisting of hydrocarbon radicals having from 1 to 8 carbon atoms having no non-aromatic unsaturation and halogen substituted derivatives thereof and $n$ is an integer.

21. The method of claim 20 in which the acid halide is acrylyl chloride and the salt is sodium acetate.

22. The method of claim 20 in which the acid halide is acrylyl chloride and the salt is disodium adipate.

23. The method of claim 20 in which the acid halide is acrylyl chloride and the salt is disodium phthalate.

24. The method of preparing polymers having a plurality of

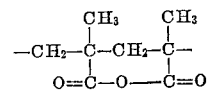

groups as part of the main polymer chain comprising treating under polymerization conditions in the substantial absence of water and in the presence of a free radical polymerization catalyst the product formed by reacting substantially equivalent proportions of an acid halide of methacrylic acid and an alkali metal salt of an acid having the formula $R_2(COOH)_n$ in which $R_2$ is selected from the class consisting of hydrocarbon radicals having from 1 to 8 carbon atoms and having no non-aromatic unsaturation and halogen substituted derivatives thereof and $n$ is an integer.

25. The method of claim 24 in which the acid halide is methacrylyl chloride and the salt is sodium acetate.

26. The method of claim 24 in which the acid halide is methacrylyl chloride and the salt is disodium phthalate.

27. The method of claim 24 in which the acid halide is methacrylyl chloride and the salt is disodium adipate.

References Cited in the file of this patent

UNITED STATES PATENTS

| | | |
|---|---|---|
| 2,143,924 | Rubenstein | Jan. 17, 1939 |
| 2,259,512 | Barnes | Oct. 21, 1941 |
| 2,324,935 | Kautter et al. | July 20, 1943 |
| 2,476,859 | Hagemeyer | July 19, 1949 |
| 2,613,222 | Specht et al. | Oct. 7, 1952 |

OTHER REFERENCES

"Modern Plastics," November 1945, p. 162, 163 and 210.

UNITED STATES PATENT OFFICE
CERTIFICATE OF CORRECTION

Patent No. 2,988,541  June 13, 1961

Waldo L. Semon et al.

It is hereby certified that error appears in the above numbered patent requiring correction and that the said Letters Patent should read as corrected below.

Column 5, line 14, after "held" insert -- at --; column 10, lines 14 and 15, the formula should appear as shown below instead of as in the patent:

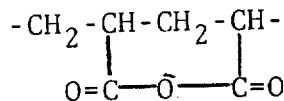

Signed and sealed this 22nd day of March 1966.

(SEAL)
Attest:

ERNEST W. SWIDER
Attesting Officer

EDWARD J. BRENNER
Commissioner of Patents